United States Patent [19]

Avdeef

[11] 3,749,894

[45] July 31, 1973

[54] ANALOG TO DIGITAL CONVERSION AND COMPUTATION METHOD

[76] Inventor: Robert A. Avdeef, 3737 Birch St., Newport Beach, Calif. 92660

[22] Filed: Mar. 19, 1971

[21] Appl. No.: 126,140

[52] U.S. Cl. .......................... 235/150.52, 340/347 NT

[51] Int. Cl. ....... G06g 7/16, G06j 1/00, H03k 13/02

[58] Field of Search .............. 340/347 NT; 235/194, 235/92 EV, 92 DM, 150.52

[56] References Cited

UNITED STATES PATENTS

| | | | |
|---|---|---|---|
| 3,462,758 | 8/1969 | Reynal et al. | 340/347 NT |
| 3,582,947 | 6/1971 | Harrison | 340/347 NT |

*Primary Examiner*—Thomas J. Sloyan
*Attorney*—Lawrence Fleming

[57] ABSTRACT

A method of multiplying or taking reciprocals of electrical analog quantities and converting the result to digital form. It is based on the known up/down or dual-ramp method of analog/digital conversion, which digitizes the ratio of an analog input to a reference input. The invention obtains reciprocals by inverting the order of the input and the reference, and obtains the product of two inputs with the aid of two integrator channels and an extra conversion step. The method is accurate and may be practiced with simpler apparatus than previous methods.

3 Claims, 4 Drawing Figures

$$T_3 = \frac{-V_{x_1}}{V_R} T_1$$

$$T_x = \frac{-V_{x_2}}{V_R} T_3$$

$$= (V_{x_1})(V_{x_2})\frac{T_1}{V_R^2}$$

$$T_x \propto (V_{x_1})(V_{x_2})$$

$$T_X = \frac{V_R}{V_X} T_1$$

$$T \propto \frac{1}{V_X}$$

INVENTOR

ROBERT A. AVDEEF

BY Laurence Fleming

AGENT

INVENTOR
ROBERT A. AVDEEF
BY Lawrence Fleming
AGENT

ANALOG TO DIGITAL CONVERSION AND COMPUTATION METHOD

BACKGROUND OF THE INVENTION

This invention relates to data processing and computation, and in particular to methods of analog/digital conversion combined with algebraic computation. A known method of analog/digital conversion is known as the dual-ramp or up/down method. It may employ an analog integrator, a comparator, a register, and a clocked digital counter. The input voltage to the integrator is switched in for a predetermined period of time; then a reference voltage of the opposite polarity is switched in in place of the input, and the integrator output runs back down to zero. The length of this run-down period is proportional to the ratio of the input to the reference. In practice, operation is repetitive and is often referred to as "pulse-width modulation."

A description of the above prior method is published in an article by Herman Schmid in "Electronic Design" magazine, Dec. 19, 1968, p. 61–65. While it is shown therein only as a means for converting an analog input to digital form without further computation, its elements appear to constitute the body of prior art that is closest to the present invention.

BRIEF SUMMARY OF THE INVENTION

The present invention combines algebraic computations, such as multiplication and taking reciprocals, with analog/digital conversion, using apparatus relat-ed generally to that used in the known up/down conversion method that is described briefly above. The invention utilizes the fact that the output of an up/down converter is proportional to a ratio. In computing reciprocals, the prior-art order of presentation of the input voltage and the reference voltage to the integrator, is inverted. The digital output of the system is then proportional to the ratio of the reference to the input, i.e., to the reciprocal of the input. In this method, additional logic circuitry may be provided to prevent errors when the input is too small, i.e., when the computed reciprocal is too large for the capacity of the counter and register.

A method of the invention may also provide a digital output proportional to the product of two inputs. Here, an additional analog integrator channel may be employed, and the process carried out in two steps. A pulse duration is obtained proportional to the ratio of one input to the reference; this time period is then made the basis of a second up/down conversion involving the second input and the reference, which yields a second pulse duration which is proportional to the desired product.

IN THE DRAWINGS

DETAILED DESCRIPTION

Figure 1:
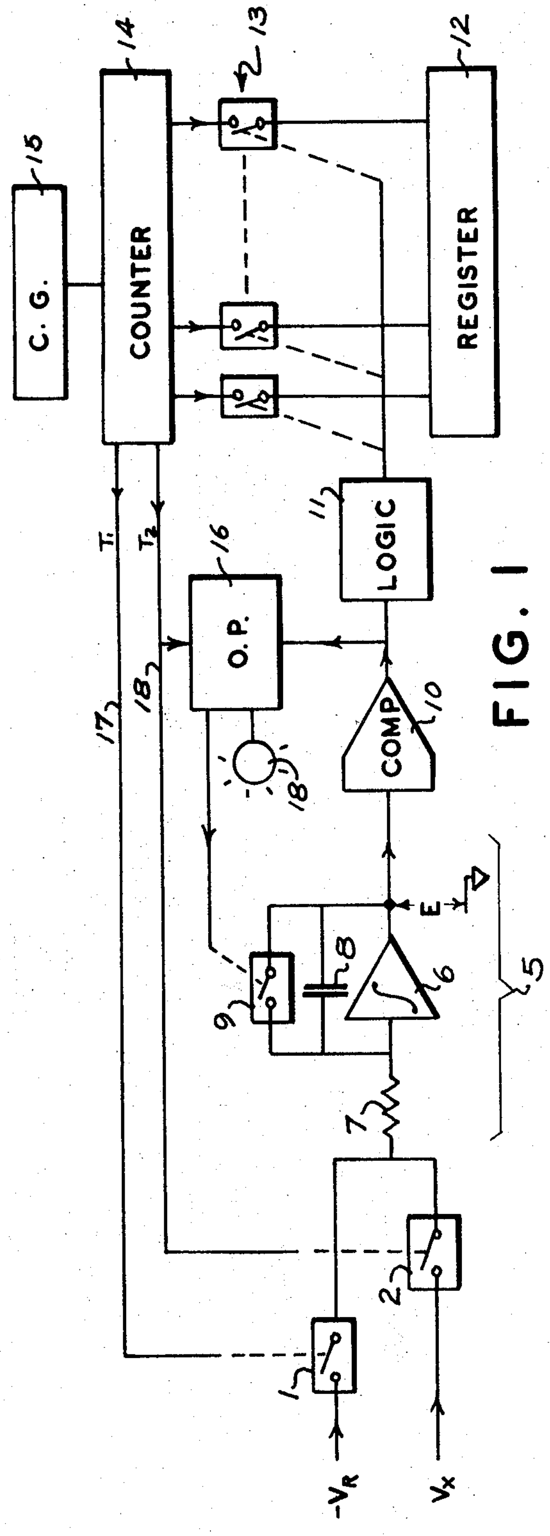
FIG. 1 is a block diagram of an up/down analog/digital converter arranged to take reciprocals according to the invention.

FIG. 1 shows an up/down analog/digital converter system arranged, according to the invention, to produce a digital output proportional to the reciprocal of an analog input voltage. Switches 1 and 2 may connect either a reference voltage $-V_r$ or the unknown input voltage $V_x$ to the input of an analog integrator indicated in toto at 5. This integrator may be of any suitable known type, and is shown in FIG. 1 as comprising an operational amplifier 6, integrating resistor 7, and integrating capacitor 8, connected as shown. A switch 9 is provided across capacitor 8 in the usual manner, to reset the initial condition of zero voltage across that capacitor. Following the integrator 5 is a comparator 10 of any suitable type, which is arranged to deliver a signal, or "fire" when the analog output E of the integrator 5 reaches a predetermined voltage level, normally zero. The comparator 10 actuates logic circuitry of any suitable type, indicated at 11. This, when the comparator 10 fires, closes a set of switches 13, which are connected between a counter 14 and a register 12. The counter and register each have a capacity corresponding to the resolution desired, e.g., 12 binary bits. The number of switches 13 corresponds to the bit capacity, e.g., 12.

Counter 14 is normally under control of a clock generator 15, which keeps it cycling continuously through its range from 000 . . . 0 to 111 . . . 1. At the instant that the comparator 10 fires (generates an output signal), the switches 13 all close momentarily, and transfer the count from counter 14 into register 12, where it is held for readout.

Buses 17 and 18 run from the counter 14 to switches 1 and 2, opening and closing them at predetermined times in the counting cycle, as will be described in more detail below in connection with FIG. 2. Logic circuits of any obvious suitable type (not shown) may be used between the counter 14 and the buses 17, 18 to help to effect the switching operations; these do not form a part of the invention.

An overrange prevention circuit, which may comprise an "AND" gate or other suitable logic, is indicated at 16, FIG. 1. If the input voltage $V_x$ is so small that the digital expression of the ratio $V_r/V_x$ would be beyond the range of the counter 14, circuit 16 closes switch 9 to reset the integrator 5, and actuates an overrange indicator 18, which may be a lamp. The operation of this circuit is described more fully below.

All the switches 1, 2, 9, 13 may be electronic switches, such as the field-effect transistor type.

Figure 2:
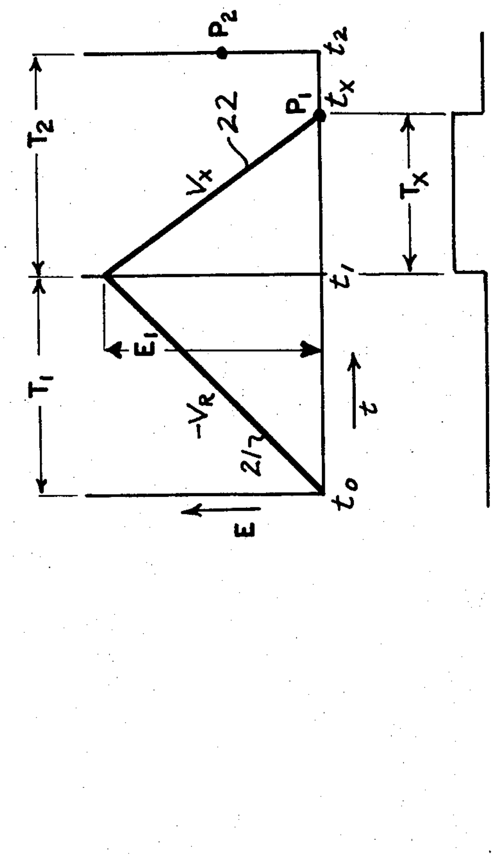
FIG. 2 is a diagram of integrator output vs. time, illustrating the operation of FIG. 1.

FIG. 2 illustrates diagrammatically the operation of the system of FIG. 1 to digitize the reciprocal of the unknown input $V_x$. At time $t = 0$, the integrator output voltage E is zero (or some other predetermined initial value). At $t = 0$, a signal from bus 17, under control of counter 14, closes switch 1. Switch 2 is open. The integrator output E now rises linearly along line 21, FIG. 2, at a rate (slope) proportional to the magnitude of $V_r$, the reference voltage. This slope is drawn, for convenience, as equal to approximately +1.

At time $t_1$, the end of period $T_1$, a signal from bus 17 opens switch 1, and a signal from bus 18 closes switch 2. Starting at this point, time $t_1$, the integrator output E begins to go back down, along line 22, at a rate or slope proportional to the magnitude of the input voltage $V_x$ ($V_x$ and $V_r$ being of opposite polarity). When line 22 intersects the zero axis at point $P_1$ (time $t_x$), the comparator 10 fires. This operates through the logic 11 to close all the switches 13, which transfer the count, as of time $t_x$, into the register 12 for readout or other use.

Time periods $T_1$, $T_2$ may be normally made both equal to the total clock time required for a full count, from 000 . . . 0 to 111 . . . 1. Thus, at $t_o$, counter 14 is at zero, and at $t_1$ it has just become full and proceeded on to zero. At time $t_2$, the end of period $T_2$, the counter 14 is again full. The count transferred to the register at time $t_x$ is, of course, an intermediate value, and is proportional to the time period $T_x$ between $t_1$ and $t_x$.

A pulse 25, FIG. 2, of duration $T_x$, may obviously be derived in known manner from switching signals available at time $t_2$ and from the output of the comparator 10.

The relationships are as follows: In an integrator such as 5, FIG. 1, $$E=\frac{1}{RC}\int V dt,$$

where $E$ is the integrator output, $R$ and $C$ are elements such as 7 and 8 respectively, and $V$ is whatever voltage is applied to the left-hand end of resistor 7. Since $V$ is taken as constant during the relatively short integration interval $t=t$ to $t=0$, which we will designate as $T$, this reduces substantially to $$E = 1/(RC)\ VT.$$

In FIG. 2, where $E_1$ is the ordinate of line 21 at time $t_1$ and also the ordinate of line 22 at the same instant, $$E_1 = -\ 1/(RC)\ V_r T_1 = -\ 1/(RC)\ V_x T_x, \text{ so that}$$

$$T_x = (-V_r/V_x)\ T_1\ ,$$

i.e., the count transferred to register 12, which is proportional to $T_x$, is proportional to the reciprocal of the analog input $V_x$, $V_r$ and $T_1$ being constants.

The maximum usable value that $T_x$ can have is equal to $T_2$, where the readout equals the full capacity of counter 14. If the period $T_x$ were longer, the readout could not accommodate it, and would be in error. To prevent this, overrange prevention logic is provided at 16. If $T_x$ is over-range, line 22, FIG. 2 will have some ordinate such as $P_2$ at time $t_2$; and the comparator will not have fired by time $t_2$. Logic block 16 detects whether the comparator has fired by time $t_2$. If it has not, block 16 provides a switching signal to switch 9, which closes and resets the integrator 5, and also actuates an indicator such as a lamp 18. If the comparator 10 has fired during interval $T_2$, logic 16 does nothing. It may be implemented in various obvious ways, using inputs from the switching signals available at time $t_1$ and the output of comparator 10.

The above process is normally run repetitively. If the rate of clock generator 15 is 10 MHz, a 12-bit conversion may be made in approximately 1 millisecond while maintaining 0.05 percent accuracy, using ordinary components. The accuracy of the up/down conversion process has been shown to be independent of the integrator time constant RC and of the clock rate.

Figure 3:
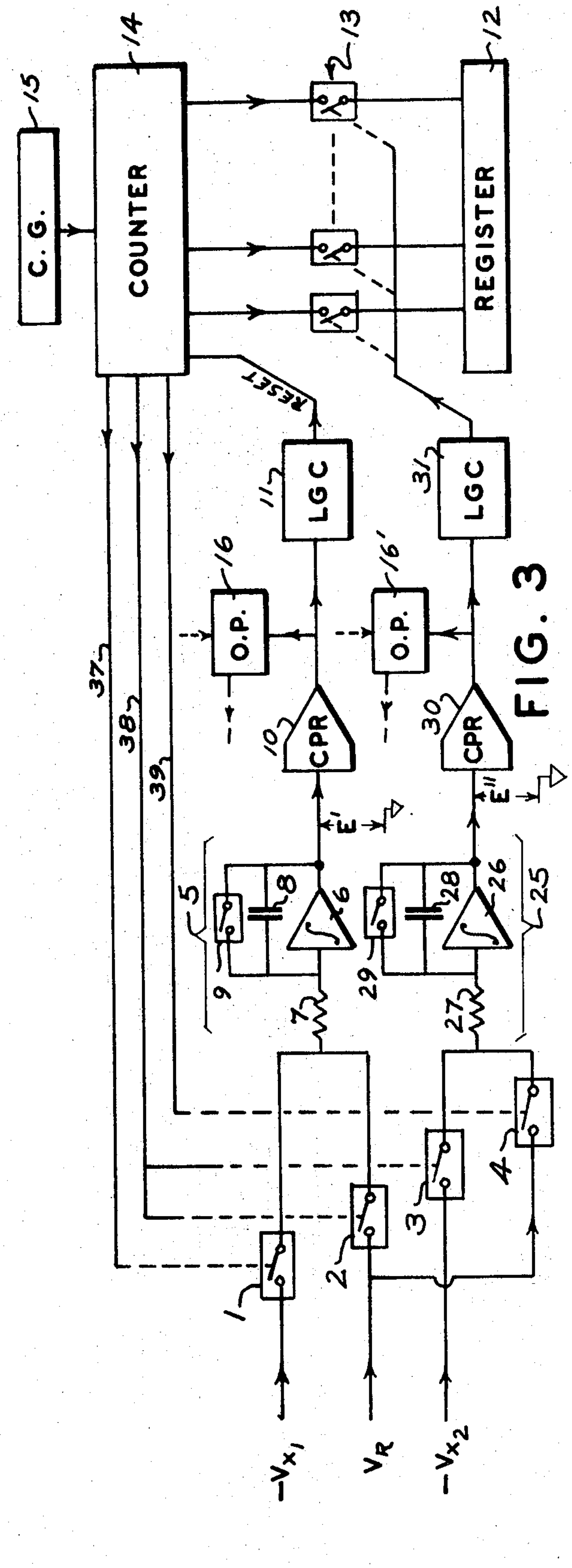
FIG. 3 is a block diagram of a novel up/down converter system for multiplying two inputs.

FIG. 3 is a block diagram of an up/down conversion system having two integrator channels, according to the invention, for producing a digital readout proportional to the product of two analog inputs $V_{x1}$, $V_{x2}$. Elements corresponding to elements in FIG. 1 are given the same reference numerals. Generally, the FIG. 2 system differs from FIG. 1 in having an additional integrator channel 25, 30, 31, and in that the first integrator channel 5, 10, 11 is connected so as to reset the counter 14 to zero.

In FIG. 3, one analog input-$V_{x1}$ goes to the input of integrator 5 via switch 1, and the reference voltage goes to the same place via switch 2. The other analog voltage input-$V_{x2}$ goes to the input of the second integrator 25 via switch 3, and the reference $V_R$ to the same place via switch 4. Both integrator channels may be identical.

Figure 4:
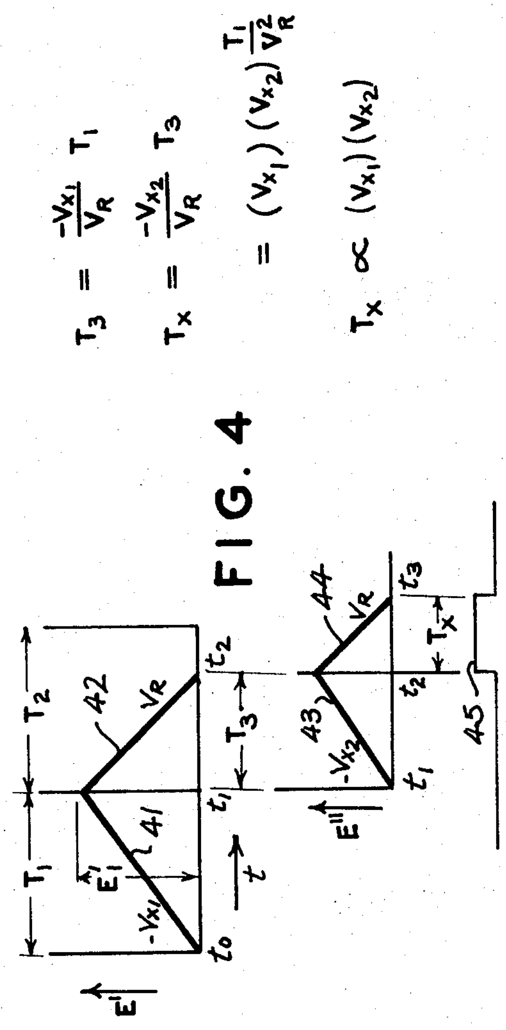
FIG. 4 is a diagram of integrator outputs vs. time, illustrating the novel method of multiplication.

FIG. 4 shows diagrammatically the operating cycle of a multiplying and conversion system such as FIG. 2. The operating steps are as follows:

1. Switch 1 closed at $t_o$, switches 2–4 open. Output E′ of integrator 5 rises linearly along line 41, at rate proportional to magnitude of $-V_{x1}$, reaching some magnitude $E_1'$ at time $t_1$.
2. Switch 1 opened, switches 2 and 3 closed at time $t_1$ (end of period $T_1$). E′ goes down along line 42, at rate proportional to $V_r$. At the same time, output E″ of integrator 25 rises linearly along line 43, at rate proportional to $-V_{x2}$.
3. Line 42 intersects zero at time $t_2$ and fires comparator 10, which resets counter 14. Simultaneously, switch 4 is closed and switches, 2, 3 opened.
4. Integrator 5 is now out of use. Output E″ of integrator 25 goes down along line 44, at rate proportional to $V_r$, until it reaches zero at time $t_3$, firing comparator 30.
5. Comparator 30 closes all the switches 13 via logic 31, transferring the count in counter 14 into register 12. Count is proportional to the run-down time of integrator 25 (line 44) or $T_x$.

A pulse 45 of duration $T_x$ may be derived in known manner from switching signals occurring at time $t_2$ and from the firing of comparator 30.

The relationships are as follows: By previous analysis, it is evident that $$T_3 = (-V_{x1})/V_r\ T_1\ , \text{ and that}$$

$$T_x = -V_{x2}/V_r\ T_3.$$

Substituting the expression for $T_3$ in the expression for $T_x$, $$T_x = [(V_{x1})\ (V_{x2})]/V_r^2\ T_1\ ,$$

i.e., $T_x$ is proportional to the product of the two inputs, $T_1$ and $V_r$ being constants.

In FIG. 4, it is evident that if lines 42 and 44 do not reach the zero (reset) level before the counter 14 reaches its full count (e.g., in period $T_2$), the computation will be in error, similarly to the situation explained in connection with FIGS. 1 and 2. Accordingly, overrange protection circuits may be employed as at 16, 16′ in FIG. 3, operating similarly to circuit 16 of FIG. 1. The manner of their operation will be evident, and accordingly, the details of the connections thereto are omitted from FIG. 4, for simplicity.

Referring again to FIG. 3, it will be seen that the signals which control switches 1–4 came from counter 14 via buses 37, 38, 39, in a manner generally similar to the control of the switches 1, 2 of FIG. 1 via buses 17, 18.

In computer data processing and control systems, the use of this invention can release a substantial amount of arithmetic and memory capacity that would otherwise be needed inside the computer.

I claim:

1. A method of electronic machine computation, comprising the following steps:

integrating a first signal proportional to a first input quantity in a first integrator over a predetermined first time period to produce a first integrator output level;

integrating a second signal proportional to a second input quantity and of polarity opposite to said first signal in said first integrator, starting back from said first integrator output level at the end of said first time period, the time integral of said second signal reaching a predetermined zero level in a first readout time inversely proportional to said second signal;

measuring the length of said first readout time period, said length being proportional to an inverse function of said second signal;

integrating a third signal in a second integrator simultaneously with the integration of said second signal in said first integrator; and integrating said second signal again in said second integrator, beginning with the end of said first readout period and ending when the integral reaches said predetermined zero level, the duration of this integration being a second readout period, said first and third signals being separate unknowns, said second signal being a known reference voltage, and the duration of said second readout period being proportional to the product of said unknowns.

2. The method of claim 1, wherein:

said second readout period is measured with a clocked counter, said counter being reset to zero at the end of said first readout period and its count transferred to a register at the end of said second readout period.

3. The method of claim 2, comprising the following additional step:

sensing whether the time integral of said said second signal reaches said predetermined zero level in either said second or said third period, and if it does not, actuating overrange indicating means.

* * * * *